(12) United States Patent
Park

(10) Patent No.: US 7,975,098 B2
(45) Date of Patent: Jul. 5, 2011

(54) RECORDING MEDIUM WITH STATUS INFORMATION THEREON WHICH CHANGES UPON REFORMATTING AND APPARATUS AND METHODS FOR FORMING, RECORDING, AND REPRODUCING THE RECORDING MEDIUM

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 11/802,477

(22) Filed: May 23, 2007

(65) Prior Publication Data

US 2007/0226234 A1    Sep. 27, 2007

(51) Int. Cl.
*G06F 12/00* (2006.01)
(52) U.S. Cl. ........................... 711/112; 711/115
(58) Field of Classification Search .............. 711/112
See application file for complete search history.

(56) References Cited

U.S. PATENT DOCUMENTS

| | | |
|---|---|---|
| 5,111,444 A | 5/1992 | Fukushima et al. |
| 5,237,553 A | 8/1993 | Fukushima et al. |
| 5,315,447 A | 5/1994 | Nakayama et al. |
| 5,386,402 A | 1/1995 | Iwata |
| 5,448,728 A | 9/1995 | Takano et al. |
| 5,552,776 A | 9/1996 | Wade et al. |
| 5,815,485 A | 9/1998 | Tanaka et al. |
| 6,115,346 A | 9/2000 | Sims |
| 6,189,118 B1 | 2/2001 | Sasaki et al. |
| 6,223,303 B1 | 4/2001 | Billings et al. |
| 6,260,156 B1 | 7/2001 | Garvin et al. |
| 6,330,210 B1 * | 12/2001 | Weirauch et al. .......... 369/30.11 |
| 6,351,788 B1 | 2/2002 | Yamazaki et al. |
| 6,526,522 B1 | 2/2003 | Park et al. |
| 6,580,684 B2 | 6/2003 | Miyake et al. |
| 6,615,363 B1 | 9/2003 | Fukasawa |
| 6,621,783 B1 | 9/2003 | Murata |
| 6,691,209 B1 | 2/2004 | O'Connell |
| 6,725,200 B1 | 4/2004 | Rost |
| 6,765,853 B1 | 7/2004 | Ko et al. |
| 6,782,488 B1 | 8/2004 | Park et al. |
| 6,785,839 B2 * | 8/2004 | Ko et al. .......................... 714/8 |
| 6,912,188 B2 | 6/2005 | Morishima |
| 6,963,523 B1 | 11/2005 | Park |
| 7,020,056 B2 | 3/2006 | Lee |
| 7,117,230 B1 | 10/2006 | Green et al. |
| 7,133,333 B2 | 11/2006 | Ko |

(Continued)

FOREIGN PATENT DOCUMENTS

CA    2 494 148    2/2004

(Continued)

OTHER PUBLICATIONS

Office Action issued Dec. 12, 2008 by the U.S. Patent and Trademark Office in counterpart U.S. Appl. No. 11/907,660.

(Continued)

*Primary Examiner* — Tuan V Thai
*Assistant Examiner* — Ngoc V Dinh
(74) *Attorney, Agent, or Firm* — Harness, Dickey & Pierce, P.L.C.

(57) ABSTRACT

A recording medium, such as a high-density and/or optical recording medium and apparatus and methods for recording to and reproducing from the recording medium, in order to initialize, reinitialize, format, and/or re-format the high-density and/or optical recording medium.

22 Claims, 20 Drawing Sheets

U.S. PATENT DOCUMENTS

| | | |
|---|---|---|
| 7,219,202 B2 | 5/2007 | Satoyama et al. |
| 7,230,893 B2 | 6/2007 | Park |
| 7,400,564 B2 | 7/2008 | Ko et al. |
| 7,480,764 B2 | 1/2009 | Park |
| 7,680,022 B2 | 3/2010 | Park |
| 2001/0018727 A1 | 8/2001 | Ando et al. |
| 2001/0034856 A1 | 10/2001 | Ko et al. |
| 2002/0036643 A1 | 3/2002 | Namizuka et al. |
| 2002/0078295 A1 | 6/2002 | Shaath et al. |
| 2002/0136118 A1 | 9/2002 | Takahashi |
| 2002/0136134 A1 | 9/2002 | Ito et al. |
| 2003/0035355 A1 | 2/2003 | Morishima |
| 2003/0048731 A1 | 3/2003 | Ozaki |
| 2003/0137910 A1 | 7/2003 | Ueda et al. |
| 2003/0137915 A1 | 7/2003 | Shoji et al. |
| 2003/0169660 A1 | 9/2003 | Shirai et al. |
| 2003/0185130 A1 | 10/2003 | Kamperman et al. |
| 2003/0210627 A1 | 11/2003 | Ijtsma et al. |
| 2003/0212564 A1 | 11/2003 | Sawabe et al. |
| 2004/0013061 A1 | 1/2004 | Wu |
| 2004/0017482 A1 | 1/2004 | Weitman |
| 2004/0174782 A1 | 9/2004 | Lee et al. |
| 2004/0174793 A1 | 9/2004 | Park et al. |
| 2004/0193946 A1 | 9/2004 | Park et al. |
| 2004/0218488 A1 | 11/2004 | Hwang et al. |
| 2004/0228238 A1 | 11/2004 | Ko et al. |
| 2004/0246852 A1 | 12/2004 | Hwang et al. |
| 2005/0083740 A1 | 4/2005 | Kobayashi |
| 2005/0111315 A1 | 5/2005 | Hwang et al. |
| 2005/0169132 A1 | 8/2005 | Kuraoka et al. |
| 2005/0195716 A1 | 9/2005 | Ko et al. |
| 2005/0207294 A1 | 9/2005 | Park |
| 2005/0207318 A1 | 9/2005 | Park |
| 2005/0207320 A1 | 9/2005 | Park |
| 2005/0259560 A1 | 11/2005 | Park |
| 2006/0083131 A1* | 4/2006 | Lee et al. ............... 369/47.1 |
| 2006/0120697 A1 | 6/2006 | Beged-Dov et al. |
| 2006/0184727 A1 | 8/2006 | Sasaki et al. |
| 2006/0221689 A1 | 10/2006 | Yoshida et al. |
| 2006/0280068 A1 | 12/2006 | Weirauch et al. |
| 2007/0053267 A1 | 3/2007 | Brondijk |
| 2007/0211589 A1 | 9/2007 | Park |
| 2007/0211590 A1 | 9/2007 | Park |

FOREIGN PATENT DOCUMENTS

| | | |
|---|---|---|
| CN | 1192818 | 9/1998 |
| CN | 1441430 A | 9/2003 |
| EP | 0 495 471 | 7/1992 |
| EP | 0997904 | 5/2000 |
| EP | 1 061 517 | 12/2000 |
| EP | 1 251 508 | 10/2002 |
| EP | 1 306 840 A2 | 5/2003 |
| EP | 1 329 888 A1 | 7/2003 |
| EP | 1 381 047 | 1/2004 |
| EP | RU 2242055 | 12/2004 |
| EP | 1505597 | 2/2005 |
| EP | 1587102 | 10/2005 |
| EP | 1 603 131 | 12/2005 |
| EP | 1 759 384 | 12/2005 |
| EP | 1 887 577 A2 | 2/2008 |
| JP | 06-259886 | 9/1994 |
| JP | 07-029177 | 1/1995 |
| JP | 07-121993 | 5/1995 |
| JP | 07-200182 | 8/1995 |
| JP | 09-213011 | 8/1997 |
| JP | 10-049986 | 2/1998 |
| JP | 10-092149 | 4/1998 |
| JP | 11-039801 | 2/1999 |
| JP | 11-066751 | 3/1999 |
| JP | 2000-195178 | 7/2000 |
| JP | 2000-195181 | 7/2000 |
| JP | 2000-285029 | 10/2000 |
| JP | 2000-322835 | 11/2000 |
| JP | 2000-322841 | 11/2000 |
| JP | 2001-126407 | 5/2001 |
| JP | 2001-351334 | 12/2001 |
| JP | 2002-015525 | 1/2002 |
| JP | 2002-092873 | 3/2002 |
| JP | 2002-124037 | 4/2002 |
| JP | 2002-175668 | 6/2002 |
| JP | 2002-278821 | 9/2002 |
| JP | 2002-288938 | 10/2002 |
| JP | 2002-328848 | 11/2002 |
| JP | 2003-059063 | 2/2003 |
| JP | 2003-208779 | 7/2003 |
| JP | 2003-228835 | 8/2003 |
| JP | 2003-242650 | 8/2003 |
| JP | 2003-323769 | 11/2003 |
| JP | 2003-346426 | 12/2003 |
| JP | 2004-005842 | 1/2004 |
| JP | 2004/030771 | 1/2004 |
| JP | 2004-030779 | 1/2004 |
| JP | 2004/039076 | 2/2004 |
| JP | 2006-313628 | 11/2006 |
| JP | 2007-529843 | 10/2007 |
| JP | 2008-052289 | 3/2008 |
| MX | PA05001548 A | 5/2005 |
| RU | 2208844 | 7/2003 |
| RU | 2225043 | 2/2004 |
| RU | 2269829 | 2/2006 |
| RU | 2 299 481 | 5/2007 |
| WO | WO 00/45386 | 8/2000 |
| WO | WO 01/01416 A1 | 1/2001 |
| WO | WO 01/18731 A1 | 3/2001 |
| WO | WO 01/22416 | 3/2001 |
| WO | WO 02/052556 | 7/2002 |
| WO | WO 02/067093 | 8/2002 |
| WO | WO 03/030173 | 4/2003 |
| WO | WO 03/102936 | 12/2003 |
| WO | WO 03/105150 | 12/2003 |
| WO | WO 04/001753 | 12/2003 |
| WO | WO 04/001754 | 12/2003 |
| WO | WO 2004/015708 | 2/2004 |
| WO | WO 2004/019326 A1 | 3/2004 |
| WO | WO 2004/025649 | 3/2004 |
| WO | WO 2004/036561 | 4/2004 |
| WO | WO 2004/079730 A1 | 9/2004 |
| WO | WO 2004/081936 A1 | 9/2004 |
| WO | WO 2004/100159 A1 | 11/2004 |
| WO | WO 2005/004154 A2 | 1/2005 |
| WO | WO 2005/086598 | 9/2005 |
| WO | WO 2005/088636 A1 | 9/2005 |

OTHER PUBLICATIONS

Japanese Office Action dated Nov. 6, 2009 for corresponding Application No. 2007-503814.
Chinese Office Action dated Oct. 23, 2009 for corresponding Application No. 200710138431.4.
Russian Notice of Allowance dated Oct. 25, 2009 for corresponding Application No. 2006136920.
Russian Notice of Allowance dated Oct. 26, 2009 for corresponding Application No. 2006136914.
USPTO Office Action dated Dec. 8, 2009 for corresponding U.S. Appl. No. 11/061,891.
Russian Office Action corresponding to Russian Application No. 2006136909/28 dated Jan. 15, 2009.
International Search Report for corresponding International Application No. PT/KR2005/00595.
English language translation of Office Action issued Mar. 30, 2009 by the Russian Patent Office in counterpart Russian Patent Application No. 2006136920.
Search Report dated May 15, 2008 for counterpart European Application No. 07111355.9-2223.
Office Action dated May 14, 2008 for counterpart European Application No. 04808643..3-2223.
Office Action issued May 22, 2009 by the Malaysian Patent Office in counterpart Malaysian Patent Application No. PI 20045424.
Office Action issued Jun. 11, 2009 by the USPTO in related U.S. Appl. No. 11/061,891.
Office Action issued Jun. 9, 2009 by the USPTO in counterpart U.S. Appl. No. 11/907,660.
Office Action from the Mexican Institute of Industrial Property dated Jun. 8, 2010 for Application No. PA/a/2006/010599.

Office Action by the Japanese Patent Office dated Jun. 4, 2010 for Application No. 2007-503814.
Office Action by the Canadian Patent Office dated May 26, 2010 for Application No. 2,559,578.
Office Action by the Canadian Patent Office dated May 27, 2010 for Application No. 2,559,575.
Office Action by the Japanese Patent Office dated Jun. 4, 2010 for Application No. 2007-503822.
"Blu-ray Disc, Rewritable Blu-ray Disc (BD-RE) Multi-Media Command Set Description", Version 0.80, Nov. 9, 2004.
Search Report for corresponding European application dated May 23, 2008.
"120 mm DVD Rewritable Disk (DVD-RAM)", ECMA Standardizing Information and Communication Systems, Standard ECMA-272, $2^{nd}$ Edition, Jun. 1999.
Office Action issued Jun. 23, 2009 by the Australian Patent Office in counterpart Australia Patent Application No. 2004317315.
Search report issued Aug. 4, 2008 by the European Patent Office in counterpart European Patent Application No. 07110264.4-2223.
Search report issued Jul. 30, 2008 by the European Patent Office in counterpart European Patent Application No. 07150328.8-2223.
Office Action issued Sep. 12, 2008 by the USPTO in counterpart U.S. Appl. No. 11/155,485.
Office Action issued Sep. 3, 2008 by the USPTO in counterpart U.S. Appl. No. 11/085,134.
Notice of Allowance for Russian patent application No. 2006136909 dated Aug. 20, 2009.
Japanese Office Action dated Oct. 16, 2009 in reference to counterpart Japanese Application No. 2007-238481.
Japanese Office Action dated Oct. 16, 2009 in reference to counterpart Japanese Application No. 2007-503819.
Chan M.Y. et al.: "Two Simple Schemes for Access Control", IEEE International Symposium on Information Theory, Sep. 17-22, 1995, p. 355.

* cited by examiner

FIG. 2

| | BD-RE | BD-R | BD-ROM |
|---|---|---|---|
| Reserved | 128 | 128 | 160 |
| PAC 2 | 32 | 32 | 32 |
| DMA 2 | 32 | 32 | |
| Control Data 2 | 32 | 32 | 32 |
| Buffer 3 | 32 | 32 | 32 |
| Buffer 2 | 32 | 32 | 192 |
| Drive Area | 32 | 128 | |
| Reserved | 96 | | |
| DMA 1 | 32 | 32 | |
| Control Data 1 | 32 | 32 | 32 |
| PAC 1 | 32 | 32 | 32 |

INFO2 (upper portion) / INFO1 (lower portion)

FIG. 4

| Data Frame | Byte position in Data Frame | contents | number of bytes |
|---|---|---|---|
| 0 | 0 | PAC_ID | 4 |
| 0 | 4 | PAC Update Count | 4 |
| 0 | 8 | Unknown PAC Rules | 4 |
| 0 | 12 | Entire_Disc_Flag | 1 |
| 0 | 13 | reserved and set to 00h | 2 |
| 0 | 15 | Number of Segments | 1 |
| 0 | 16 | Segment_0 | 8 |
| 0 | 24 | Segment_1 | 8 |
| 0 | 32 | : | 29*8 |
| 0 | 264 | Segment_31 | 8 |
| 0 | 272 | reserved and set to 00h | 112 |
| 0 | 384 | PAC specific information | 1664 |
| 1 | 0 | PAC specific information | 2048 |
| : | : | : | : |
| 31 | 0 | PAC specific information | 2048 |

FIG. 5

| Area | | Bits | Control Type |
|---|---|---|---|
| | | b31 to b24 | reserved |
| | ⋮ | ⋮ | ⋮ |
| INFO 1,2,3,4 | DMA Zones | b7 | write |
| Data Zones | Spare Areas | b6 | write |
| INFO 1,2,3,4 | Control Data Zones | b5 | write |
| | | b4 | read |
| Data Zones | User Data Area | b3 | write |
| | | b2 | read |
| INFO 1&2 | PAC Cluster | b1 | write |
| | | b0 | read |

FIG. 7

| Data Frame | Byte position in Data Frame | contents | number of bytes |
|---|---|---|---|
| 0 | 0 | PAC_ID | 4 |
| 0 | 4 | PAC Update Count | 4 |
| 0 | 8 | Unknown PAC Rules | 4 |
| 0 | 12 | Entire_Disc_Flag | 1 |
| 0 | 13 | reserved and set to 00h | 2 |
| 0 | 15 | Number of Segments | 1 |
| 0 | 16 | Segment_0 | 8 |
| 0 | 24 | Segment_1 | 8 |
| 0 | 32 | : | 29*8 |
| 0 | 264 | Segment_31 | 8 |
| 0 | 272 | reserved and set to 00h | 112 |
| 0 | 384 | number of Recorder ID entries | 2 |
| 0 | 386 | Year/Month/Date of initial recording | 4 |
| 0 | 390 | Re-initialization Count | 2 |
| 0 | 392 | reserved and set to 00h | 120 |
| 0 | 512 | Recorder ID for RID_Tag 01h | 128 |
| 0 | 640 | Recorder ID for RID_Tag 02h | 128 |
| 0 | 768 | Recorder ID for RID_Tag 03h | 128 |
| : | : | : | : |
| 0 | 1920 | : | 128 |
| 1 | 0 | Recorder ID for RID_Tag xxh | 128 |
| : | : | : | : |
| 15 | 1920 | Recorder ID for RID_Tag FCh | 128 |
| 16 | 0 | reserved and set to 00h | 2048 |
| : | : | : | : |
| 31 | 0 | reserved and set to 00h | 2048 |

FIG. 9

| Contents | Number of bytes |
|---|---|
| DDS identifier = "DS" | 2 |
| DDS format = 00h | 1 |
| · · · | |
| First PSN of Drive Area(P_DA) | 4 |
| First PSN of Defect List(P_DFL) | 4 |
| Location of LSN 0 of User Data Area | 4 |
| Inner Spare Area 0 size(ISA0_size) | 4 |
| Outer Spare Area size(OSA_size) | 4 |
| Inner Spare Area 1 size(ISA1_size) | 4 |
| Status bits of INFO1/PAC1 location on L0 | 8 |
| Status bits of INFO2/PAC2 location on L0 | 8 |
| Status bits of INFO1/PAC1 location on L1 | 8 |
| Status bits of INFO2/PAC2 location on L1 | 8 |
| · · · | |

FIG. 10

| b(n+1), bn | Contents in PAC location |
|---|---|
| 00 | unrecorded |
| 01 | PAC_ID = 00 00 00 00h<br>or = FF FF FF FFh |
| 10 | invalid PAC |
| 11 | valid PAC |

FIG. 11A

| byte position | bits | INFO1/PAC1 on L0 |
|:---:|:---:|:---:|
| 64 | b7 b6 | 1st PAC Cluster |
| 64 | b5 b4 | 2nd PAC Cluster |
| 64 | b3 b2 | 3rd PAC Cluster |
| 64 | b1 b0 | 4th PAC Cluster |
| 65 | b7 b6 | 5th PAC Cluster |
| ⋮ | ⋮ | ⋮ |
| 70 | b1 b0 | 28th PAC Cluster |
| 71 | b7 b6 | 29th PAC Cluster |
| 71 | b5 b4 | 30th PAC Cluster |
| 71 | b3 b2 | 31st PAC Cluster |
| 71 | b1 b0 | 32nd PAC Cluster |

FIG. 11B

| byte position | bits | INFO2/PAC2 on L0 |
|---|---|---|
| 72 | b7 b6 | 1st PAC Cluster |
| 72 | b5 b4 | 2nd PAC Cluster |
| 72 | b3 b2 | 3rd PAC Cluster |
| 72 | b1 b0 | 4th PAC Cluster |
| 73 | b7 b6 | 5th PAC Cluster |
| ⋮ | ⋮ | ⋮ |
| 78 | b1 b0 | 28th PAC Cluster |
| 79 | b7 b6 | 29th PAC Cluster |
| 79 | b5 b4 | 30th PAC Cluster |
| 79 | b3 b2 | 31st PAC Cluster |
| 79 | b1 b0 | 32nd PAC Cluster |

FIG. 11C

| byte position | bits | INFO1/PAC1 on L1 |
|---|---|---|
| 80 | b7 b6 | 1st PAC Cluster |
| 80 | b5 b4 | 2nd PAC Cluster |
| 80 | b3 b2 | 3rd PAC Cluster |
| 80 | b1 b0 | 4th PAC Cluster |
| 81 | b7 b6 | 5th PAC Cluster |
| ⋮ | ⋮ | ⋮ |
| 86 | b1 b0 | 28th PAC Cluster |
| 87 | b7 b6 | 29th PAC Cluster |
| 87 | b5 b4 | 30th PAC Cluster |
| 87 | b3 b2 | 31st PAC Cluster |
| 87 | b1 b0 | 32nd PAC Cluster |

FIG. 11D

| byte position | bits | INFO2/PAC2 on L1 |
|---|---|---|
| 88 | b7 b6 | 1st PAC Cluster |
| 88 | b5 b4 | 2nd PAC Cluster |
| 88 | b3 b2 | 3rd PAC Cluster |
| 88 | b1 b0 | 4th PAC Cluster |
| 89 | b7 b6 | 5th PAC Cluster |
| ⋮ | ⋮ | ⋮ |
| 94 | b1 b0 | 28th PAC Cluster |
| 95 | b7 b6 | 29th PAC Cluster |
| 95 | b5 b4 | 30th PAC Cluster |
| 95 | b3 b2 | 31st PAC Cluster |
| 95 | b1 b0 | 32nd PAC Cluster |

| PAC #0(Primary PAC) (PAC_ID = 50 52 4D 00h) |
|---|
| PAC #1(unknown PAC) (PAC_ID = A) |
| PAC #2(unknown PAC) (PAC_ID = B) |
| PAC #3 (PAC_ID = 00 00 00 00h or PAC_ID = FF FF FF FFh) |
| PAC #4 (Unrecorded) |
| ⋮ |
| PAC #31 (Unrecorded) |

⇒ formatting

| PAC #0(Primary PAC) (PAC_ID = 50 52 4D 00h) |
|---|
| PAC #1(unknown PAC) (PAC_ID = A) |
| PAC #2(unknown PAC) (PAC_ID = B) |
| PAC #3 (PAC_ID = 00 00 00 00h or PAC_ID = FF FF FF FFh) |
| PAC #4 (Unrecorded) |
| ⋮ |
| PAC #31 (Unrecorded) |

(b)

| PAC Zone | PAC #0 | PAC #1 | PAC #2 | PAC #3 | PAC #4 | ⋯ | PAC #31 |
|---|---|---|---|---|---|---|---|
| PAC I.F in DDS | 11 | 11 | 11 | 01 | 00 | ⋯ | 00 |

↓ formatting

| PAC I.F in DDS | 01 | 01 | 01 | 01 | 00 | ⋯ | 00 |
|---|---|---|---|---|---|---|---|

FIG. 13
(a)
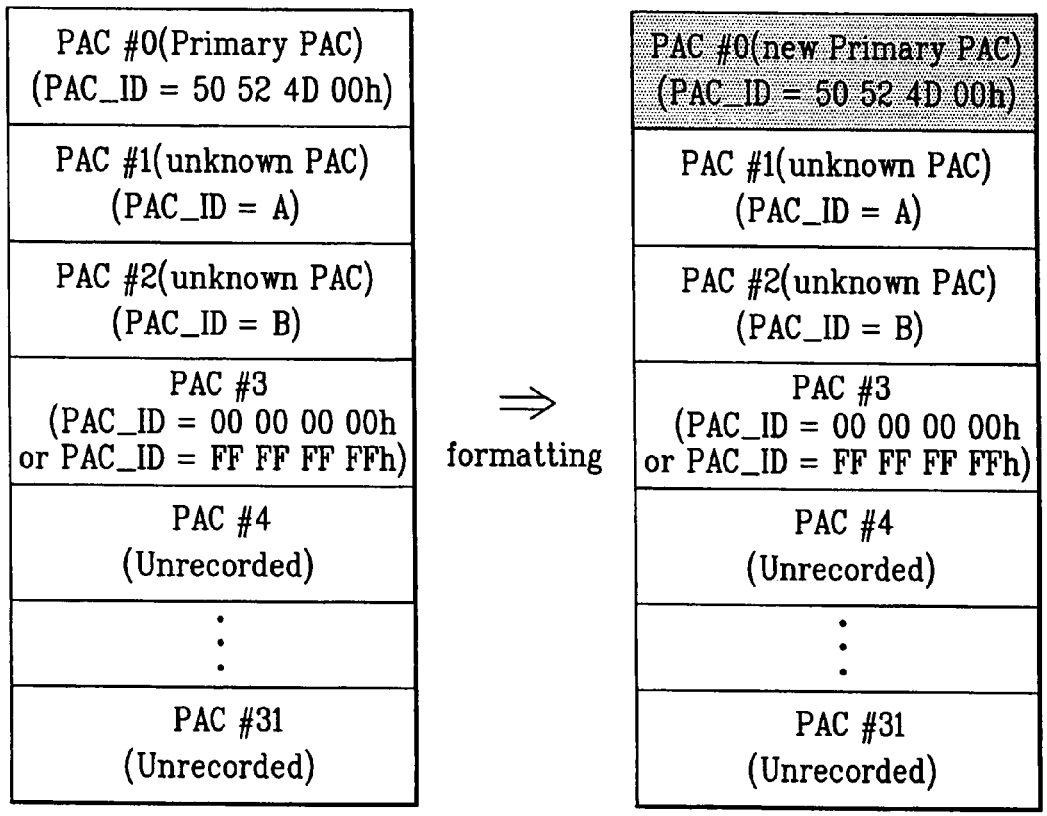
(b)
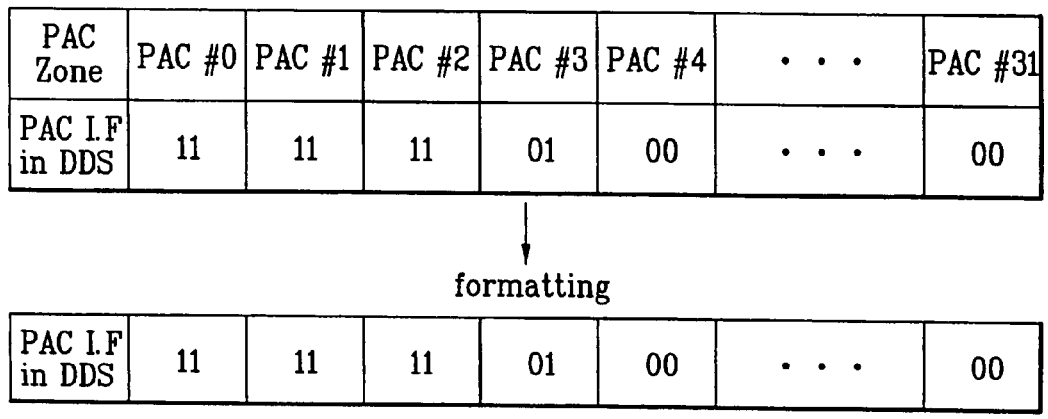

| PAC #0(Primary PAC)<br>(PAC_ID = 50 52 4D 00h) |
|---|
| PAC #1(unknown PAC)<br>(PAC_ID = A) |
| PAC #2(unknown PAC)<br>(PAC_ID = B) |
| PAC #3<br>(PAC_ID = 00 00 00 00h<br>or PAC_ID = FF FF FF FFh) |
| PAC #4<br>(Unrecorded) |
| ⋮ |
| PAC #31<br>(Unrecorded) |

⇒ formatting

| PAC #0(new Primary PAC)<br>(PAC_ID = 50 52 4D 00h) |
|---|
| PAC #1(unknown PAC)<br>(PAC_ID = 00 00 00 00h<br>or PAC_ID = FF FF FF FFh) |
| PAC #2(unknown PAC)<br>(PAC_ID = 00 00 00 00h<br>or PAC_ID = FF FF FF FFh) |
| PAC #3<br>(PAC_ID = 00 00 00 00h<br>or PAC_ID = FF FF FF FFh) |
| PAC #4<br>(Unrecorded) |
| ⋮ |
| PAC #31<br>(Unrecorded) |

(b)

| PAC Zone | PAC #0 | PAC #1 | PAC #2 | PAC #3 | PAC #4 | ... | PAC #31 |
|---|---|---|---|---|---|---|---|
| PAC I.F in DDS | 11 | 11 | 11 | 01 | 00 | ... | 00 |

↓ formatting

| PAC I.F in DDS | 11 | 01 | 01 | 01 | 00 | ... | 00 |
|---|---|---|---|---|---|---|---|

| PAC #0(Primary PAC)<br>(PAC_ID = 50 52 4D 00h) |
|---|
| PAC #1(unknown PAC)<br>(PAC_ID = A) |
| PAC #2(unknown PAC)<br>(PAC_ID = B) |
| PAC #3<br>(PAC_ID = 00 00 00 00h<br>or PAC_ID = FF FF FF FFh) |
| PAC #4<br>(Unrecorded) |
| ⋮ |
| PAC #31<br>(Unrecorded) |

⇒ formatting

| PAC #0(new Primary PAC)<br>(PAC_ID = 50 52 4D 00h) |
|---|
| PAC #1(unknown PAC)<br>(PAC_ID = A) |
| PAC #2(unknown PAC)<br>(PAC_ID = 00 00 00 00h<br>or PAC_ID = FF FF FF FFh) |
| PAC #3<br>(PAC_ID = 00 00 00 00h<br>or PAC_ID = FF FF FF FFh) |
| PAC #4<br>(Unrecorded) |
| ⋮ |
| PAC #31<br>(Unrecorded) |

(b)

| PAC Zone | PAC #0 | PAC #1 | PAC #2 | PAC #3 | PAC #4 | ... | PAC #31 |
|---|---|---|---|---|---|---|---|
| PAC I.F in DDS | 11 | 11 | 11 | 01 | 00 | ... | 00 |

↓ formatting

| PAC I.F in DDS | 11 | 11 | 01 | 01 | 00 | ... | 00 |
|---|---|---|---|---|---|---|---|

RECORDING MEDIUM WITH STATUS INFORMATION THEREON WHICH CHANGES UPON REFORMATTING AND APPARATUS AND METHODS FOR FORMING, RECORDING, AND REPRODUCING THE RECORDING MEDIUM

CROSS-REFERENCE TO RELATED APPLICATIONS

This U.S. non-provisional application claims priority of U.S. application Ser. No. 11/061,891 filed on Feb. 22, 2005, the entire contents of which are hereby incorporated by reference.

BACKGROUND OF THE INVENTION

1. Field of the Invention

The present invention relates to managing physical access control (PAC) and recording data, media containing PAC and recording data (for example, high density optical discs, such as Blu-ray Disc) and apparatus and methods for recording and/or reproducing data to and/or from the media.

2. Discussion of the Related Art

Media, for example, optical discs may be used for recording a large quantity of data. Of the optical discs available, a new high density optical media (HD-DVD), for example, the Blu-ray Disc (hereafter called as "BD") is under development, which enables increased recording and/or storing of high definition video and/or audio data.

BD further includes a rewritable Blu-ray disc (BD-RE), Blu-ray disc writable once (BD-WO), and Blu-ray disc read only (BD-ROM).

Currently, one problem with existing systems is the potential incompatibility between drives of different versions, for example a drive of a previous version with a previous set of capabilities may have difficulty interacting with a medium that has interacted with a drive including at least one capability from a subsequent set of capabilities.

Another problem with existing systems is determining an initialization, re-initialization, formatting, and/or reformatting procedure for physical access control (PAC) information stored on the medium, for example, a rewritable Blu-ray disc (BD-RE).

SUMMARY OF THE INVENTION

Example embodiments of the present invention provide at least one access control information area on a medium, such as a high density optical disc, and apparatus and methods for recording data to and reproducing data from the medium using access control information stored in an access control information area. The access control information area may be initialized, re-initialized, formatted, and/or reformatted.

An example embodiment provides a recording medium including a plurality of recording layers. Each recording layer includes at least one access control information area for storing an access control information controlling an access to the recording medium; and a status information area for storing a status information of the access control information. The status information is changed upon initializing of the access control information area.

An example embodiment provides a method of reformatting a recording medium having a plurality of recording layers. The method includes identifying at least one access control information and status information for each of the at least one access control information recorded in each recording layer of the recording medium; and changing the status information for each of the at least one access control information upon reformatting based on the status information.

An example embodiment provides a method of initializing a recording medium having a plurality of recording layers. The method includes reading status information indicating a status of an access control information recorded in an access control information area of the recording medium in each recording layer; and if initializing of the recording medium is allowed, recording changed status information on the recording medium according to the initializing of the recording medium. The changed status information indicates the status of an initialized access control information area in each recording layer.

An example embodiment provides a method of recording on a recording medium having a plurality of recording layers. The method includes identifying an access control information and status information for the access control information; and recording the changed status information for the access control information on the recording in each recording layer. The status information changing upon initializing of the recording medium in each recording layer An example embodiment provides a method of reproducing from a recording medium having a plurality of recording layers. The method includes identifying an access control information and status information for the access control information; and reproducing the changed status information for the access control information from the recording medium. The status information changes upon initializing of the recording medium An example embodiment provides an apparatus for recording to and/or reproducing from a recording medium having a plurality of recording layers. The apparatus includes a controller for controlling to record or reproduce the data based on an access control information and status information for access control information; and a pick-up for recording or reproducing the changed status information for the access control information on the recording medium. The status information changes upon initializing of the recording medium.

An example embodiment provides a recording medium including a plurality of recording layers. Each recording layer includes an access control information area for storing at least one access control information controlling an access to the recording medium; and a status information area for storing at least one status information of each access control information. The status information indicates a reusable status for the access control information in initialized area of the recording medium.

An example embodiment provides a recording medium including a plurality of recording layers. Each recording layer includes an access control information area for storing at least one type of access control information controlling an access to the recording medium, and a status information area for storing at least one status information of each access control information. The status information indicates a valid status for the primary type of the access control information and indicates a reusable status for other type of the access control information in initialized area of the recording medium.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of example embodiments of the invention and are incorporated in and constitute a part of this application, illustrate example embodiment(s) of the invention where.

FIG. 2 illustrates an INFO2 zone and an INFO1 zone on a high density optical disc in accordance with an example embodiment of the present invention;

FIG. 4 illustrates a PAC on a high density optical disc in accordance with an example embodiment of the present invention;

FIG. 5 illustrates an "Unknown PAC Rules" field in accordance with an example embodiment of the present invention;

FIG. 7 illustrates a Primary PAC zone on a high density optical disc in accordance with an example embodiment of the present invention;

FIG. 9 illustrates a DDS on a high density optical disc in accordance with an example embodiment of the present invention;

FIG. 10 indicates status information of a PAC zone in accordance with an example embodiment of the present invention;

FIGS. 11A-11D illustrate structures, each showing a PAC status information field of a DDS which indicates status information of a PAC zone, in accordance with an example embodiment of the present invention;

FIGS. 12A-12B illustrate initializing a PAC in accordance with an example embodiment of the present invention;

FIGS. 13A-13B illustrate initializing a PAC in accordance with another example embodiment of the present invention;

FIGS. 14A-14B illustrate initializing a PAC in accordance with another example embodiment of the present invention;

FIGS. 15A-15B illustrate initializing a PAC in accordance with another example embodiment of the present invention.

DETAILED DESCRIPTION OF EXAMPLE EMBODIMENTS OF THE INVENTION

Reference will now be made in detail to example embodiments of the present invention, illustrated in the accompanying drawings. Wherever possible, the same reference numbers will be used throughout the drawings to refer to the same or like parts.

In an example embodiment, in addition to its ordinary and customary meaning, the term "physical access control (PAC)" may include additional information being recorded on the disc for managing/controlling data recording and reproduction for an entire disc or a specific segment within a physical zone of the disc. The term "physical access control (PAC)" may be referred to as "PAC", "PAC information", and/or "PAC control information" for simplicity.

In addition, a zone within the disc on which the PAC is recorded may be referred to as a "PAC zone" and the PAC being recording in the PAC zone in cluster units may be referred to as a "PAC cluster" for simplicity.

Furthermore, a PAC according to example embodiments of the present invention may include an "unknown rule", which may restrict read/write of data for the entire disc or a specific segment, for a drive having a specifically unknown PAC_ID and including a drive of a previous version (for example, a "legacy" version"). A PAC having an "unknown rule" applied thereto may be referred to as an "Unknown PAC". Similarly, a known specific PAC_ID recorded on the PAC may be referred to as a "known rule" and "PAC specific information" that is applied to the PAC may be referred to as a "Known PAC".

In an example embodiment, a "Known PAC" may be a PAC having information related to a date of disc initialization and information (for example, Recorder ID, if one disc is recorded with many recorders, this may be useful information) on a recorder (which may be an optical disc drive) of each cluster on the disc and may be referred to as a "Primary PAC".

A structure in which the PAC is recorded on the PAC zone, and apparatus and method for recording and reproducing a data by using the same will be described with reference to the attached drawings.

Figure 1A:
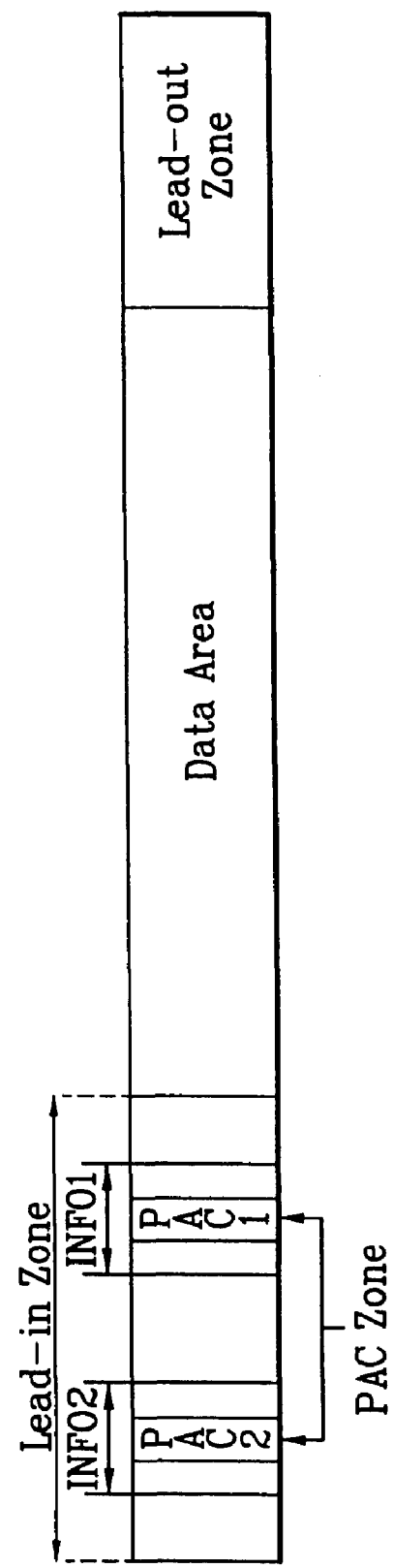
FIGS. 1A and 1B illustrate PAC zones on a high density optical disc in accordance with an example embodiment of the present invention.
Figure 1B:
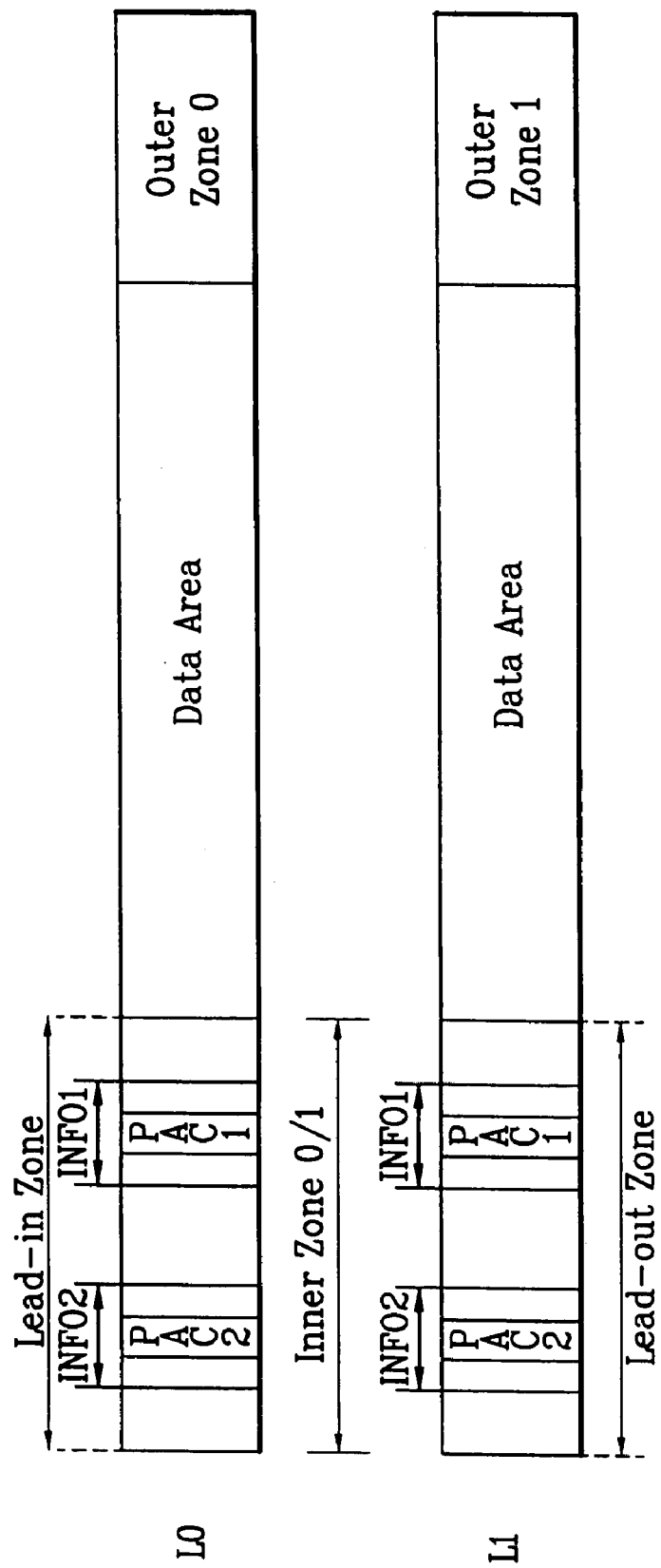

FIGS. 1A or 1B illustrate PAC zones on a high density optical disc in accordance with an example embodiment of the present invention.

Referring to FIG. 1A, the high density optical disc may be partitioned from an inner circumference to an outer circumference, into a lead-in zone, a data zone, and a lead-out zone.

The lead-in zone may be further partitioned into an INFO2 zone and an INFO1 zone for recording various kinds of information thereon. The INFO2 zone and an INFO1 zone may include PAC (Physical Access Control) zones.

For convenience, a PAC zone assigned to the INFO2 zone may be labeled a PAC2 zone and the PAC zone assigned to the INFO1 zone may be labeled a PAC1 zone. One of the PAC2 zone and the PAC1 zone may have an original PAC recorded thereon and the other one may have a back up zone for recording a copy of the original PAC. If a writing direction is from the inner circumference to the outer circumference of the disc, it may be advantageous that the original PAC is recorded on the PAC2 zone and the backup PAC is recorded on the PAC1 zone.

FIG. 1B illustrates a diagram of a dual layer disc structure having two recording layers including first recording layer (L0: Layer 0) and second recording layer (L1: Layer 1), wherein each of the recording layers includes a Lead-in/out Zone (also called as an Inner Zone), a Data Area, and an Outer Zone 0, or 1.

Each of the lead-in zone (inner zone 0) and the lead-out zone (inner zone 1) may include an INFO 2 zone and an INFO 1 zone for recording management information of the disc, and the PAC zones may be located in the INFO2 zone and/or the INFO1 zone.

Similar to a single layer disc, a PAC zone assigned to the INFO2 zone may be labeled a PAC2 zone and the PAC zone assigned to the INFO1 zone may be labeled a PAC1 zone. One of the PAC2 zone and the PAC1 zone may have an original PAC recorded thereon and the other one may have a back up zone for recording a copy of the original PAC. If a writing direction is from the inner circumference to the outer circumference of the disc, it may be advantageous that the original PAC is recorded on the PAC2 zone and the backup PAC is recorded on the PAC1 zone.

In the example shown in FIG. 1B, because the PAC1 and PAC2 zones are not only in the lead-in zone, but also in the lead-out zone for the dual layer disc, the dual layer disc has a PAC size two times greater than the single layer disc.

The PAC zone may be provided to handle problems that may occur when an older version of a drive apparatus cannot detect functions on a disc added having functions compatible with a newer version of a drive apparatus. The PAC zone may handle compatibility problems using one or more an "unknown rules".

An "unknown rule" may be used to control predictable operations of the disc, for example, basic control of read, write, etc., linear replacement of a defective zone, logical overwrite, etc. An area may also be provided on the disc, indicating where the "unknown rule" is applicable, for example, segments for defining the entire disc or a certain portion of the disc, which is described later in more detail.

In areas of the disc managed by the "unknown rule", there may be provided a DMA (Disc Management Area), a Spare Area, a User Data Area, and/or other similar areas.

In areas of the disc managed by the "unknown rule", there are a DMA (Disc Management Area), a Spare Area, a User Data Area, and the like, and particularly, with regard to the User Data Area, segment areas which are predetermined areas on the disc the "unknown rule" is applicable thereto can be designated thereto. (The segment will be described in more detail, later.)

That is, by using the "unknown rule", rules and/or other operations for controlling predictable operations of the above areas, such as, starting from basic operations of recording and reproducing, linear replacement of a defective area, logical overwrite of the BD-WO, and/or other similar operations may be defined.

Thus, by defining an area of the disc, an older version drive apparatus is able to access by using the "unknown rule", a newer version of the disc reduces unnecessary access operation of the older version drive apparatus.

Moreover, by defining an accessible area on a physical area of the disc for an older version drive apparatus to access by using the PAC, a data area containing user data recorded thereon can be protected more robustly and/or unauthorized access (for example, hacking) of the disc may be prevented or reduced.

The INFO2 zone and the INFO1 zone having the PAC2 and 1 zones therein in the lead-in zone may be reviewed in view of writable characteristics of the high density optical disc.

FIG. 2 illustrates INFO2 zone and the INFO1 zone on a high density optical disc in accordance with an example embodiment of the present invention.

Referring to FIG. 2, for an example BD-RE high density optical disc, the INFO2 zone may have 256 clusters including 32 clusters of PAC2 zone, 32 clusters of DMA (Defect Management Area) 2 zone for management of defects, 32 clusters of CD (Control Data) 2 zone having control information recorded thereon, and/or 32 clusters of BZ (Buffer Zone) 3 zone of a buffer zone.

The INFO1 zone may include 32 clusters of BZ2 zone of a buffer area, 32 clusters of drive area which may be a drive area for storing information specific to a drive, 32 clusters of DMA1 zone for managing defects, 32 clusters of CD1 zone for recording control information, and/or a BZ1-PAC1 zone utilizable as the PAC zone.

For a write once high density optical disc (BD-R), the INFO2 zone may have 256 clusters including a PAC2 zone, a DMA 2 zone, a CD 2 zone, and a BZ 3 zone, each with 32 clusters, and the INFO1 zone includes a BZ2 zone, a DMA1 zone, a CD1 zone, and/or a BZ1-PAC1 zone, each with 32 clusters, and 128 clusters of drive area.

For a read only high density optical disc (BD-ROM), the INFO2 zone may have 256 clusters including a PAC2 zone, a CD 2 zone, and a BZ 3 zone, each with 32 clusters, and the INFO1 zone 256 clusters including a CD1 zone, and/or a BZ1-PAC1 zone, each with 32 clusters.

The PAC zones of example embodiments of the present invention may be assigned to the INFO2 zone and/or the INFO1 zone in the lead-in zone in 32 clusters each, according to rewritable characteristics of the high density optical disc.

In an example of a dual layer disc having two recording layers, the PAC zone may be designated, not only in the lead-in zone, but also in the lead-out zone, such that one PAC zone may have 64 clusters.

In a PAC zone of 32 clusters (or 64 clusters), one PAC may have one cluster, for recording a plurality of valid PACs. There also may be a plurality of one cluster sized PACs if desired. An example structure in which one PAC is recorded as one cluster is described with reference to FIG. 3.

Figure 3:
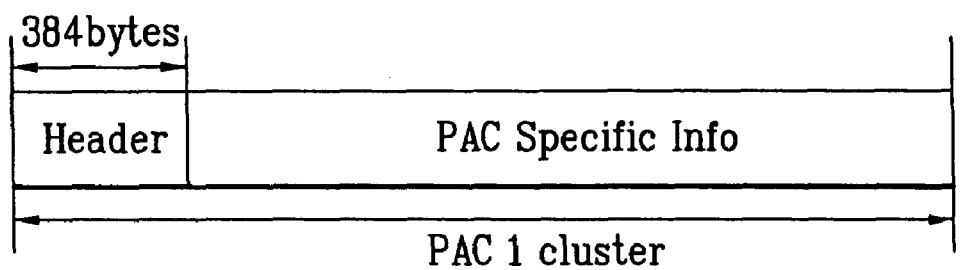
FIG. 3 illustrates a PAC recorded on a high density optical disc in accordance with an example embodiment of the present invention.

FIG. 3 illustrates a diagram of a structure of a PAC recorded on a high density optical disc in accordance with an example embodiment of the present invention.

Referring to FIG. 3, one PAC of one cluster size (32 sectors) may include a header zone and a specific information zone, specific to a particular disc drive (for example, an optical disc drive).

The PAC header zone may have 384 bytes allocated to a first sector of the PAC, for recording various kinds of PAC information, such as information on an "unknown PAC rule" and segments, and another area of the PAC zone may have information specific to the (optical) disc drive may be referred to as "known rules" recorded thereon.

An example structure of a PAC recorded in above structure is described with reference to FIG. 4. For convenience, in the description, particular fields of the PAC that require more detailed description will refer to drawings that illustrate the particular fields.

FIG. 4 illustrates a diagram showing a structure of a PAC on a high density optical disc in accordance with an example embodiment of the present invention.

Referring to FIG. 4, the PAC may include a header portion (in an example, up to 384 bytes of the first frame)applicable to all PACs and an area having information specific to the drive, recorded thereon.

An example header portion may include 4 bytes of "PAC_ID", 4 bytes of "Unknown PAC Rules", 1 byte of "Entire Disc Flag", 1 byte of "Number of Segments", and/or 32 "segments Segment_0~Segment_31 each with 8 bytes.

The "PAC_ID" may provide the present PAC status and identification codes, for example, if the "PAC_ID" is '00 00 00 00h', the "PAC_ID" may indicate that the present PAC is not used, and if the "PAC_ID" is 'FF FF FF FFh', the "PAC_ID" may indicate that the present PAC zone is available for use again even if the PAC zone has been used previously.

By recording the "PAC_ID" in predetermined bits, such as '54 53 54 00h', the "PAC_ID" is used as a code for determining if the disc is one that the present drive can make free access. That is, if the present drive does not know the "PAC_ID" applied thus, determining that this is a case when the present drive can not understand the present PAC under a reason of version mismatch, or the like, the '54 53 54 00h' is used as code requiring to refer to information recorded on the "Unknown PAC Rules" field.

As described, the "Unknown PAC Rules" field may be used as a field that designates an operation range of a drive that can not recognize the present PAC, which will be described further with reference to FIG. 5.

FIG. 5 illustrates a diagram showing a configuration of an "Unknown PAC Rules" field in accordance with an example embodiment of the present invention.

Referring to FIG. 5, a degree of controllability of various areas on the disc may be enabled by the "Unknown PAC Rules". In this example, the "Area" column in FIG. 5 represents the controllable areas on the disc, the "Control" column represents control types, such as read/write etc., and "Number of bits" column represents a number of bits required for control. The additional bits in the "Number of bits" column may represent cases of dual layer disc with two recording/reproduction sides.

Referring to FIG. 5, a degree of controllability of various areas on the disc may be enabled by the "Unknown PAC Rules". In this example, the "Area" column in FIG. 5 represents the controllable areas on the disc, the "Control Type" column represents control types, such as read/write etc., and "Bits" column represents a number of bits required for control. The additional bits in the "Bits" column may represent cases of dual layer disc with two recording/reproduction sides.

"Unknown PAC Rules" may be used to control a number of areas on a disc. For example, "Unknown PAC Rules" can indicate recording controllability on Disc Management Area (DMA) zones (which may or may not include a Disc Definition Structure (DDS) in the INFO 1, 2, 3 and/or 4 zones, can indicate recording controllability on the Spare Areas in the Data Zone, can indicate recording and/or reproducing controllability on the Control Data (CD) Zone in the INFO1, 2, 3, and/or 4 zones, can indicate recording and/or reproducing controllability on the User Data Area in the Data Zone, and/or can indicate recording and/or reproducing controllability on the "PAC cluster" in the INFO1 and/or 2 zone.

The following example rule may be applicable to areas (except the "PAC cluster" area. In the case where the control type is write, for example, for Bits=b3, b5, b6, b7, etc., if an allocated bit is set to '0', this may be used to indicate an area relevant thereto is writable and if an allocated bit is set to '1', this may be used to indicate an area relevant thereto is not writable.

In the case where the control type is read, for example, for Bits=b2, b4, etc., if an allocated bit is set to '0', this may be used to indicate an area relevant thereto is readable, and if an allocated bit is set to '1', this may be used to indicate an area relevant thereto is not readable.

With regard to the "PAC cluster" zone, in a case where the control type is write (Bits=b1), and if an allocated bit is '0', this may be used to indicate that overwrite on the present PAC is possible or status bits of a Disc Definition Structure (DDS) is changeable. If an allocated bit is '1', this may be used to indicate overwrite on the present PAC is not possible or status bits of the DDS are not changeable. The DDS will be described in more detail below.

Also, with regard to the "PAC cluster" zone, in a case where the control type is read (Bits=b0), and if an allocated bit is '0', this may be used to indicate that the "PAC cluster" zone is readable and contents of the present cluster are transferable externally (for example, to a host or other similar device) of a drive. If the allocated bit is '1', this may be used to indicate that contents (so called known rule) of the present PAC cluster are not transferable except the first 384 bytes (a header) of a first data frame, which is settable only when it is intended to control the disc by an unknown rule.

In an example of the User Data Area, if a segment area which is a "special" area on the disc (which is described below) is defined, the User Data Area may be used as a field for indicating recording and/or reproducing controllability on the segment area, and not necessarily the entire User Data Area.

Write controllability is applicable only to re-writable discs BD-RE and BD-R and the write controllability of a replacement area for a defective area is also applicable to the re-writable discs BD-RE and BD-R. As a result, various example features of the present invention may depend on the re-writable characteristics of the high density (optical) disc.

Using the above technique, the "Unknown PAC Rules" field enables designation of a controllable area on the disc for a drive with a version mismatch. Moreover, the above technique may also be applicable to control access to a particular physical area on a disc at a user's option.

Returning to FIG. 4, the "PAC Update Count" field in FIG. 4, may indicate a number of the PAC updates, may have '0' written initially, and/or may be incremented by one every time the PAC is re-written.

Further, in FIG. 4, the "Entire Disc Flag" field may be used as a field for indicating that the PAC is applicable to an entire area of the disc and the "Number of Segments" field is a field that may represent a number of segment areas to which the PAC is applicable.

In an example, even in the case of b0=0 when re-initialization is allowed, if writing is not allowed by another write inhibition mechanism (for an example, a write protect (WP) flag of DDS), the initialization is inhibited. That is, the "Entire Disc Flag" may be operative in an OR-function with other write inhibition mechanisms.

The "Entire Disc Flag" field can be used as a field applicable, not only to a case of an unknown PAC, but also to a case of a known PAC. That is, allowability of re-initialization of even a known PAC which understands the PAC_ID enabling to apply the known rule may be controlled through the "Entire Disc Flag" field.

In another example, without providing the "Entire Disc Flag" field as described above, it may also be possible that the allowability of re-initialization may be indicated with one extra bit (for example, of the 32 bits of the "Unknown PAC Rule" field) as a "re-initialization flag" for indicating the allowability of re-initialization.

Moreover, it should be apparent that functions of the "Entire Disc Flag" field are not limited to flag named as such. As is clear, the function of the "Entire Disc Flag" field is applicable to the re-initialization of a PAC, and the field may be identified as a "Initialization bit of PAC" field.

Further, in FIG. 4, the "Number of Segments" field is a field that may represent a number of segment areas to which the PAC is applicable.

In an example embodiment, a maximum number of segments may be allocatable to one PAC. In an example embodiment, a maximum number of 32 segments can be allocated to one PAC and information on the allocated segments may be written in "Segment_0" to "Segment_31" fields, each including 8 bytes. Each of the "Segment_0~31" fields may include the first physical sector number (PSN) and the last PSN of the allocated segment area recorded thereon.

Figure 6:
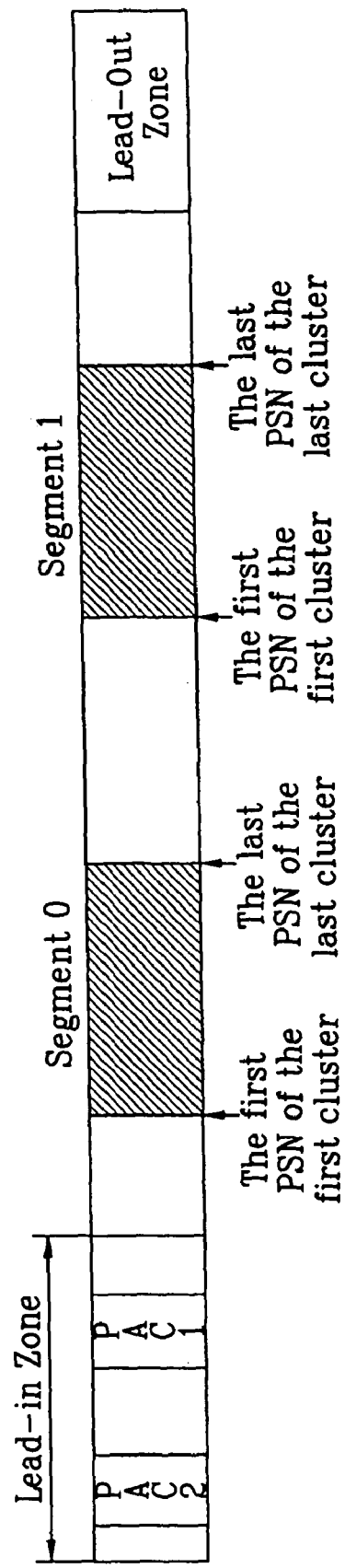
FIG. 6 illustrates a high density optical disc in accordance with an example embodiment of the present invention.

Segments are described in more detail below. FIG. 6 illustrates segment zones on a high density optical disc in accordance with an example embodiment of the present invention.

Referring to FIG. 6, if required, there may be a maximum number (for example, 32) of segment areas on the high density optical disc, for applying the PAC thereto. The maximum number of segment area may start from "segment 0".

Up to the maximum number of segments can be allocated starting from "segment 0" in an ascending order for management by one PAC, and even if there are a plurality of PACs, total number of the segment areas managed by the PACs should not exceed the maximum number of segments.

In an example, positions of the segment areas may be identified by an optical disc drive by writing the first PSN, which may indicate a starting position of the allocated segment area and the last PSN which may indicate the last position of the allocated segment area on "Segment" fields.

In an example arrangement, none of the plurality of allocated segments need overlap and the starting and ending positions may be designated at boundaries of clusters.

Thus, in example embodiments, the present invention may provide a plurality of PACs, to manage a number (for example, 32) segment areas, which are described in more detail below.

FIG. 7 illustrates a PAC zone on a high density optical disc in accordance with an example embodiment of the present invention.

Referring to FIG. 7, a "Primary PAC" may include 4 bytes of "PAC_ID", 4 bytes of "PAC Update Count", 4 bytes of "Unknown PAC Rules", 1 byte of "Entire_Disc_Flag", 1 byte of "number of Segments", a total of 32 "Segment_0~Segment_31 each with 8 bytes, 2 bytes of "number of Recorder ID entries", 4 bytes of "Year/Month/Date of initial recording", 2 bytes of "Re-initialization Count", and/or a plurality of "Recorder ID for RID_Tag xxh" fields each with 128 bytes.

The "number of Recorder ID entries", the "Year/Month/Date of initial recording", the "Re-initialization Count", and the "Recorder ID for RID_Tag xxh" fields of the "Primary PAC" may be referred to as a "known rule", which is PAC specific Info characterizing A "Primary PAC". A "Primary PAC" having such a structure is discussed below.

As described above, the "PAC_ID" field may be used as a field for providing a status and identification code of the present PAC and be recorded in '50 52 4D 00h' for indicating the Primary PAC, specifically. '50 52 4D 00h' represents characters "PRM", and the last 00h bit indicates that a version of the Primary PAC is '0'.

The "PAC Update Count" field may be used to indicate a number of updates of the Primary PAC, may be written as 00h at the time of initialization, and may be incremented by one every time the Primary PAC is re-written.

The "Unknown PAC Rules" field is a field that may be used for designating an operation range of a drive that does not understand the Primary PAC identified by "PAC_ID" having a structure as shown in FIG. 5, and may be set to control the DMA area, the spare area, the control data area, the user data area, the PAC cluster area, and/or other similar data.

The "Entire_Disc_Flag" field of the Primary PAC may be set to 00h for allowing initialization, and, if no segment area is allocated, the "Number of Segments" field, and the "Segment_i" fields may be set to 00h.

The "number of Recorder ID entries" field is a field that may be used to indicate a number of recorder IDs of 128 byte size and/or a maximum allowable number in the Primary PAC of 252.

The "Year/Month/Date of initial recording" field is a field that may be used for recording a Year, a Month, and a date of initial recording of the disc thereon and the "Re-initialization Count" field is a field that may be used for indicating a number of re-initialization of the disc.

The "Recorder ID for RID_Tag xxh" field is a field having 128 bytes allocated thereto that may be used for recorder ID information for recording drive signatures of all recorders thereon. The 128 bytes of drive signature may include 48 bytes of a manufacturer's name, 48 bytes of additional identification information, and/or 32 bytes of serial number.

In another example, there may be a plurality of PACs, so that the plurality of PACs manage the entire disc or segment areas which can be allocated up to a maximum (for example, 32), which will be described in more detail below.

Figure 8:
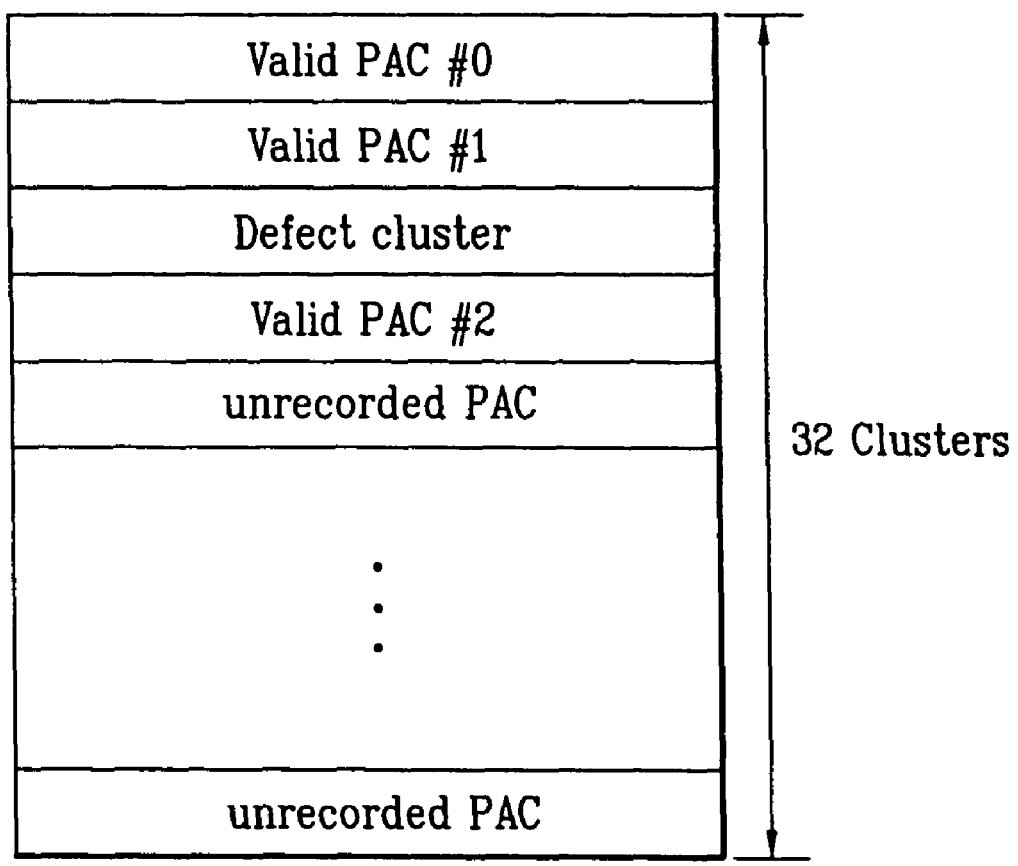
FIG. 8 illustrates a PAC zone on a high density optical disc in accordance with an example embodiment of the present invention.

FIG. 8 illustrates a PAC zone on a high density optical disc in accordance with an example embodiment of the present invention.

Referring to FIG. 8, a plurality of valid PACs, each of the same cluster size, may be written on one PAC zone (a PAC zone of INFO2 or INFO1), each with 32 clusters.

As described above, a valid PAC may be defined as a zone containing the various kinds of PAC information and a maximum number (for example, 32, or 64 in the case of a dual layer disc) of valid PACs may be provided on a disc, each with one cluster size that can be allocated to one PAC zone.

As described above, the valid PAC may have a PAC_ID (for example, PAC_ID=54 53 54 00h) selected in advance according to a drive version of the optical disc having the PAC recorded thereon, and a remainder of the PAC zone may have a PAC of FF FF FF FFh recorded thereon if the PAC_ID is 00 00 00 00h, and the PAC zone not recorded yet is still an unrecorded PAC zone.

A remainder of the PAC zone having no valid PACs recorded thereon may have a PAC with a PAC_ID of 00 00 00 00h or FF FF FF FFh, and a PAC zone having nothing record thereon may be left as an unrecorded PAC.

In an example embodiment, if a defect occurs at one PAC zone the PAC is to be written thereon, the PAC may be written at an area next to the defective area. The defect may be caused by damage to, or contamination of a disc surface, and when the defect occurs at the area the PAC is to be written thereon, the PAC information may be written on an area next to the defective area.

Operations such as finding a position of a valid PAC zone from the PAC zone or finding a position of a next writable PAC zone while avoiding an area written already to require no more writing, and defective area from above PAC zone may an important matter in view of initialization and recording speed of the disc and many retries may be required for reading a defective area.

In an example embodiment, the present invention describes a method in which status information on positions of the plurality of valid PACs, a position of the next writable PAC, and/or other relevant information may be written on a DDS (Disc Definition Structure).

A DDS may be a zone containing information on the first PSN of a defect list, a position of a user data zone, sizes of spare areas, and/or other relevant information, and may be information written on the DMA zone of the disc as information on DMS (Defect Management Structure) together with DFL (Defect List).

The information written in the DMA may be information scanned and pre-loaded in advance when the disc is loaded into a drive. Therefore, once various status information on the PAC, such as positions of the plurality of valid PACs, a position of the next writable PAC, and/or other relevant information is written in the DDS as pointers, the optical disc drive may obtain information on the PAC zone without needing to scan all the PAC zones.

A DDS may include various kinds of information on status of the PAC zone and will be described below.

FIG. 9 illustrates a DDS on a high density optical disc in accordance with an example embodiment of the present invention.

FIG. 9 illustrates a diagram showing an example embodiment of a DDS on a high density optical disc in accordance with an example embodiment of the present invention. The example embodiment of FIG. 9 illustrates a dual layer disc, but the teachings of FIG. 9 are equally applicable to a single layer disc.

Referring to FIG. 9, the DDS may include a "DDS identifier" field, a "DDS format" field, a "First PSN of Drive Area (P_DA)" field representing the first physical sector number of a drive area, a "First PSN of Defect List (P_DFL)" field representing the first PSN of the defect list, a "Location of LSN 0 of User Data Area" field representing a position of an LSN (logical sector number) of the user data area, an "Inner Spare Area 0 size (ISA0_size)" field representing a size of an inner spare area 0, an "Outer Spare Area size (OSA_size)" field representing a size of an outer spare area 0, an "Inner Spare Area 1_size (ISA1_size)" field representing a size of an inner spare area 1, a "Status bits of INFO1/PAC1 location on L0" field having status information on the PAC1 in the INFO1 zone of the first recording layer L0 recorded thereon, a "Status bits of INFO2/PAC2 location on L0" field having status information on the PAC2 in the INFO2 zone of the first recording layer L0 recorded thereon, a "Status bits of INFO1/PAC1 location on L1" field having status information on the PAC1 in the INFO1 zone of the second recording layer L1 recorded thereon, and/or a "Status bits of INFO2/PAC2 location on L1" field having status information on the PAC2 in the INFO2 zone of the second recording layer L1 recorded thereon.

As indicated in the above example, the DDS may provide various status information on the PAC, such as a position of cluster having valid PAC allocated thereto, the next writable area, and/or other similar information.

An example of PAC status information of a PAC zone in accordance with an example embodiment of the present invention is described in more detail with reference to FIG. 10.

Referring to FIG. 10, two bits (for example) may be allocated to each field provided for indicating status information of the PAC zone recorded on the DDS. In the example of FIG. 10, 00 indicates that the PAC cluster is unrecorded, 01 indicates that the PAC cluster has a PAC with a PAC_ID=00 00 00 00h, or PAC_ID=FF FF FF FFh recorded thereon, 10 indicates that the PAC cluster is an invalid PAC (for example, due to a defect), and 11 indicates that the PAC cluster is a valid PAC.

A defect is not the only reason a PAC cluster may be identified as invalid. For example, when the PAC cluster is not readable due to "Unknown PAC Rules" too, the PAC cluster may also be identified as an invalid PAC, with 10. That is, as described above, the bit b0 of "Unknown PAC Rule" may be used as a bit for indicating if the PAC cluster is readable, wherein even if the PAC cluster is re-writable in a case where the bit is set to 1, the PAC cluster is indicated as an invalid PAC.

Another example of PAC status information of a PAC zone in accordance with an example embodiment of the present invention is described in more detail with reference to FIGS. 11A-11D, which each illustrate structures showing a PAC status information field of a DDS which indicate status information of a PAC zone FIG. 11A illustrates a structure of "Status bits of INFO1/PAC1 location on L0" field for indicating status information of the PAC1 zone designated to the INFO1 zone of the first recording layer L0.

Referring to FIG. 11A, the "Status bits of INFO1/PAC1 location on L0" field may have a total 8 bytes (64 bits) allocated thereto starting from a byte position of 64 (for example) to a byte position of 71 (for example), wherein by indicating status information with two bits for each of PAC clusters, information on a total number (for example, 32) of PAC clusters may be indicated.

Accordingly, for example, if bits b7-b6 are 11 at a 64 byte position, this may be used to indicate that the first PAC cluster in the PAC1 zone on the first recording layer has a valid PAC. Also, if bits b5-b4 are 01 at a 64 byte position (for example), this may be used to indicate that the second PAC cluster in the PAC1 zone on the first recording layer has a PAC_ID=00 00 00 00h or PAC_ID=FF FF FF FFh, indicating that the PAC cluster has a writable PAC.

Also, the "Status bits of INFO2/PAC2 location on L0" field may be recorded by the same method for the PAC2 zone on the INFO2 zone on the first recording layer, which is shown in FIG. 11B.

FIG. 11C illustrates an example structure of a "Status bits of INFO1/PAC1 location on L1" field having status information on a PAC1 in the INFO1 zone of the second recording layer L1, and FIG. 11D an example structure of a "Status bits of INFO2/PAC2 location on L1" field having status information on a PAC2 in the INFO2 zone of the second recording layer L1, wherein information on the PAC cluster is indicated as described above.

In example embodiment, characteristics of a PAC of the present invention can be summarized as follows.

In valid PACs, there may be "Unknown PAC" and "Known PAC" depending on whether the valid PAC understands a PAC_ID, or not, wherein the "Unknown PAC" has recording and/or reproducing control information on certain areas on the disc (for example, the DMA area, the spare area, the user data area, the PAC cluster, and/or other similar areas). The recording and/or reproducing control information on the user data area may be used as recording and/or reproducing control information on the segment area, if the segments are allocated to the user data area.

The "Known PAC" may include specific information, specific to the PAC, and a "Primary PAC" may be defined as a type of "Known PAC", having disc initialization date information, recorder ID information, and/or other similar information.

A PAC zone may have a plurality of valid PACs designated thereto and the status of various PAC of the PAC zone may be recorded in a DDS.

Initialization of a re-writable high density optical disc (BD-RE) is likely. Disc initialization and preparation for using the disc again may include formatting a DMS area and a PAC and scanning and certifying to update Defect List (DFL) information. Because updating the DFL information is an option, initialization as defined in the present invention may also include formatting or reformatting.

Initialization of a re-writable high density optical disc (for example, BD-RE) as defined in the present invention is intended to include re-initialization, formatting, and re-formatting.

For the initialization of a re-writable high density optical disc (for example, BD-RE), it may be necessary to first verify if an inserted disc can be initialized. Verification of whether the disc can be initialized can be made using the "Entire disc Flag" field (which may also be termed an "initialization bit of PAC") and/or a disc recording inhibition mechanism (for an example, a write protect (WP_flag) of a DDS). In an example, if a bit, b0 of the "Entire disc Flag" field is set (for example, to '1') or if the recording inhibition mechanism inhibits the recording on the disc, initialization is not permitted.

In a case where the "Entire disc Flag" field that indicates if the initialization is allowed or not is applicable to a "Known PAC", the "Known PAC" can be initialized if the "Entire disc Flag" field allows initialization.

In a case where the disc is controlled by an unknown PAC, initialization may not be possible if the "Unknown PAC Rule" inhibits recording on a data zone.

In a case where a disc can be initialized, various, example embodiments for initializing (or re-initializing, formatting, or reformatting) a high density optical disc according to example embodiments of the present invention are described below.

FIGS. 12A-12B illustrate a technique for initializing a PAC in accordance with an example embodiment of the present invention, wherein FIG. 12A illustrates changes of the PAC zone following initialization of the PAC and FIG. 12B illustrates a technique for recording in a DDS area, PAC related status information following initialization of the PAC.

Referring to FIGS. 12A and 12B, in an example initialization method, the PAC zone is left as is, and only the DDS PAC related status information is changed.

That is, as shown in FIG. 12B, only DDS information that represents status information on the PAC zone is changed to a next writable state. For an example, bits 11 that indicate position information of the valid PAC are changed to bits 01 to indicate that a PAC zone is a next writable PAC zone, and bits 01 or bits 00 that indicate an original writable area is maintained as is.

Without separate initialization of the PAC zone, this example technique enables a comparatively simple PAC zone initialization process by changing only the DDS information to identify an entire PAC zone as a writable area. A method of initialization by DDS information change, without physical initialization of the PAC zone, such as the example described above, may be referred to as logical initialization (or a logical format).

FIGS. 13A-13B illustrate a technique for initializing a PAC in accordance with another example embodiment of the present invention.

Referring to FIGS. 13A-13B, the "Known PAC" including the "Primary PAC" is initialized and the "unknown PAC" is left as is. As described, initialization of a "Primary PAC" which may be considered a type of "Known PAC" may be possible because the "Entire disc flag" may be set to "0" (discussed below).

When there is no "Primary PAC" on the disc, the disc may be initialized by setting the "PAC Update Count" field and the "Re-initialization Count" field to '0' at the "Primary PAC", to produce a new "Primary PAC". In this case, a Year/Month/Day of recording initialization may be recorded on the "Year/Month/Day of initial recording" field, and the recorder ID at the time of initialization may be recorded on the "Recorder ID for RID_Tag01" field.

If there is a "Primary PAC" on the disc, the new "Primary PAC" increments a "PAC Update Count" field value by one and sets the Year/Month/Day of recording initialization on the "Year/Month/Day of initial recording" field. Moreover, all the recorder ID lists recorded already are erased, and a recorder ID of initial recording may be recorded on the "Recorder ID for RID_Tag01" field, and the "Re-initialization Count" field may be incremented by one.

If the "Primary PAC" is initialized by an above method, while the "Unknown PAC" is left as is, all information on a valid PAC in the DDS remains intact, as shown in FIG. 13B.

An "Unknown PAC" may be left as is at the time of disc initialization because the PAC has information not only on the user area, but also other areas (for example, the DMA area, the spare area, the control data area, and/or other similar areas) on the disc. As a result, initialization leaving the "Unknown PAC" as is, regardless of user data, is possible.

FIGS. 14A-14B illustrate a technique for initializing a PAC in accordance with another example embodiment of the present invention.

Referring to FIGS. 14A-14B, both the "Known PAC" and the "Unknown PAC" may be initialized, including the "Primary PAC".

Accordingly, referring to FIG. 14A, both an "Unknown PAC" with a PAC_ID=A (where "A" is an arbitrary designator), and an "Unknown PAC" with a PAC_ID=B (also an arbitrary designator) are initialized into next writable areas PAC_ID=00 00 00 00h or PAC_ID=FF FF FF FFh. The "Primary PAC" may be initialized, for example, using the technique shown in FIGS. 13A-13B.

Referring to FIG. 14B, bits 11 may be used to indicate a valid PAC of the "Unknown PAC" and PAC related information of the DDS may be changed to 01.

FIGS. 15A-15B illustrate a technique for initializing a PAC in accordance with another example embodiment of the present invention.

Referring to FIGS. 15A-15B, similar to FIGS. 14A-14B, both the "Known PAC" and the "Unknown PAC" may be initialized, including the "Primary PAC", while accounting for bit b1 of the "Unknown PAC Rule" into account.

That is, as described above, if bit b1 of the "Unknown PAC Rule", a recording control bit for the PAC cluster area, is set to 1 (for example), to inhibit rewriting on the PAC cluster, initialization of the "Unknown PAC" is inhibited, and if bit b1 of the "Unknown PAC Rule" is set to 0 (for example), to allow rewriting on the PAC cluster, initialization of the "Unknown PAC" is made possible.

Therefore, if it is desired to leave an "Unknown PAC" as is, regardless of the User data, it is possible to leave the "Unknown PAC" as is by using bits b1, and, for the "Unknown PAC" to be left as is, DDS information is left as 11 as a valid PAC.

Figure 16:
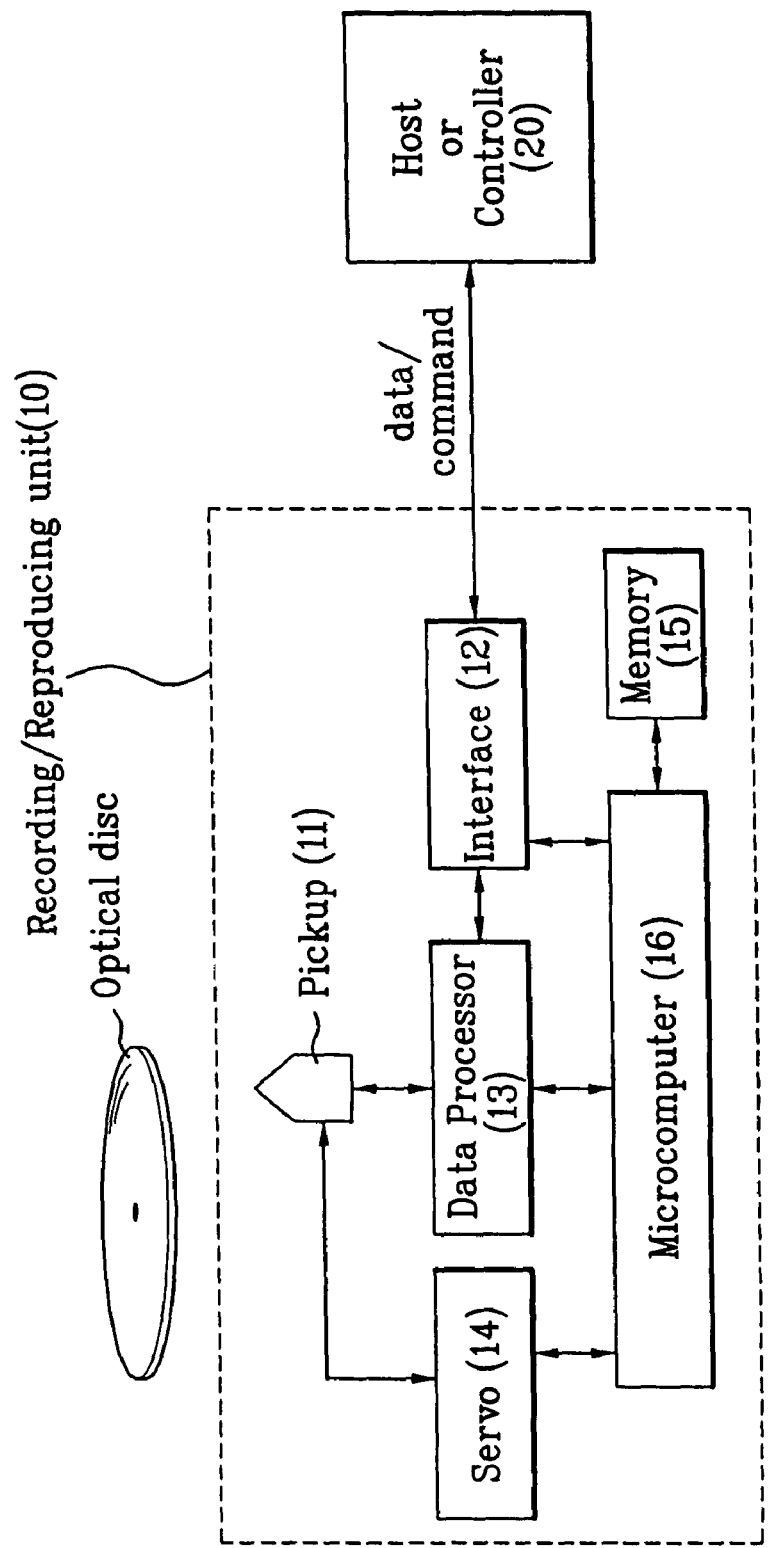
FIG. 16 illustrates a block diagram of an optical recording/reproducing apparatus in accordance with an example embodiment of the present invention.

FIG. 16 illustrates a block diagram of an optical recording/reproducing apparatus in accordance with an example embodiment of the present invention.

Referring to FIG. 16, the optical recording/reproducing apparatus may include a recording/reproducing device 10 for performing recording/reproduction on the optical disc and a host, or controller 20 for controlling the recording/reproducing device 10. In an example embodiment, the recording/reproducing device 10 may act as the "optical disc drive" discussed above in conjunction with many example embodiments of the present invention.

In an example embodiment, the host 20 gives a writing or reproduction instruction to write to or reproduce from a particular area of the optical disc to the recording/reproducing device 10, and the recording/reproducing device 10 performs the recording/reproduction to/from the particular area in response to the instruction from the host 20.

The recording/reproducing device 10 may further include an interface part 12 for performing communication, such as exchange of data and instructions with the host 20, a pickup part 11 for writing/reading a data to/from the optical disc directly, a data processor 13 for receiving a signal from the pickup part 11 and recovering a desired signal value or modulating a signal to be written into a signal able to be written on the optical disc, a servo part 14 for controlling the pickup part 11 to read a signal from the optical disc accurately or to write a signal on the optical disc accurately, a memory 15 for temporary storage of various kinds of information including management information and data, and a microcomputer 16 for controlling various parts of the recording/reproducing device 10.

An example method for recording a PAC on a high density writable optical disc using the example optical recording/reproducing apparatus will be described below.

Upon inserting the optical disc into the optical recording/reproducing apparatus, management information may be read from the optical disc and stored in the memory 15 of the recording/reproducing device 10, for use at the time of recording/reproduction of the optical disc.

In this state, if the user desires to write on a particular area of the optical disc, the host 20, taking this as a writing instruction, provides information on a desired writing position to the recording/reproducing device 10, together with a data to be written.

The microcomputer 16 in the recording/reproducing device 10 may receive the writing instruction, determine if the area of the optical disc the host 20 desires to write is a defective area or not from the management information stored in the memory 15, and/or perform data writing according to the writing instruction from the host 20 on an area which is not a defective area.

If it is determined that writing on an entire disc or on a particular area of the disc includes new features which a previous version of the recording/reproducing device is not provided with, leading the previous version of the recording/reproducing device to fail to sense, or if it is intended to restrict functions, such as writing or reproducing to/from a particular area of the disc according to restriction set by the user, the microcomputer 16 of the recording/reproducing device 10 may write control information of the area in the PAC zone on the disc as an "Unknown PAC rule". The microcomputer 16 of the recording/reproducing device 10 may also write PAC information, such as the PAC_ID for a written state, and segment information which is control information on the particular area of the disc.

Moreover, the microcomputer 16 of the recording/reproducing device 10 may also write a PAC_ID and segment information on a particular area of the disc as PAC information. The recorder ID information may be recorded on the "Recorder ID for RID_Tag of the "Primary PAC".

PAC information may be written in a plurality of valid PACs on the PAC 1 zone of the INFO 1 zone as required at a one cluster size and a copy of the PAC recorded on the PAC1 zone may be written on the PAC2 zone of the INFO 2 zone as a backup.

The microcomputer 16 may provide position information of the area the data is written thereon, or the PAC zone, and the data to the servo 14 and the data processor 13, so that the writing is finished at a desired position on the optical disc through the pickup part 11.

Initialization of a high density optical disc having a PAC recorded thereon by the above-described method may be performed as described above under the control of the microcomputer 16 of the recording and reproducing device 10. In a example embodiment, an "Unknown PAC" may be initialized when a cluster having the PAC recorded thereon is writable and initialization of the "Primary PAC" of the "Known PAC" may be made by recording information on a recorder ID and date of the initialization, and updating related count information.

In another example embodiment, a method for recording to and/or reproducing from a high density optical disc having a PAC written thereon will be described.

Upon inserting an optical disc into the optical recording/reproducing apparatus, management information may be read from the optical disc and stored in the memory 15 of the recording and reproducing device 10, for use at the time of recording and reproduction of the optical disc.

The information in the memory 10 may include position information of various zones included in the PAC zone on the disc. Particularly, positions of valid PACs in the PAC zone may be known from disc definition structure (DDS) information. After positions of the valid PACs are known, a PAC_ID field of the PAC may be examined, for verifying if the PAC_ID is an identifiable PAC_ID.

If the PAC_ID is identifiable, the method determines that a recording and reproducing device having written the data on the disc has a version identical to a version of the present recording and reproducing device or there are no separate writing/reproduction restrictions, and the recording/reproduction is performed according to the instruction from the host 20.

If the PAC_ID is not identifiable, determining that it is a case when there are recording and reproducing restrictions for entire disc or a segment area, the recording/reproduction may be performed according to an instruction from the host 20 from with reference to recording/reproduction restriction areas on the disc written as the "Unknown PAC rule" and/or the "Segment".

The microcomputer 16 may then provide the location information and data according to the instruction from the host to the servo 14 and the data-processor 13, so that the recording/reproduction is finished at a desired location on the optical disc through the pickup part 11.

As described above, the methods and apparatus for recording and reproducing in a high density optical disc according to example embodiments of the present invention may have one or more of the following advantages.

First, the various embodiments of updating a PAC zone and DDS information related thereto permits effective initialization of a high density optical disc.

Second, various embodiments for recording/reproducing data using a PAC permits effective data recording/reproduction to/from a high density optical disc.

It will be apparent to those skilled in the art that various modifications and variations can be made to the example embodiments of the present invention described above without departing from the spirit or scope of the invention. Thus, it is intended that the present invention covers the modifications and variations of this invention provided they come within the scope of the appended claims and their equivalents.

What is claimed is:

1. A recording medium, comprising:
a control data area for storing different versions of access control information, the access control information controlling an access to a plurality of segment regions within a user data area of the recording medium and specifying the segment regions to which the corresponding access control information applies, the access control information including predetermined rules and update information, the predetermined rules being used to control the access and specifying operation/operations to be applicable to the record medium when the access control information is not identified by an apparatus attempting to record/reproduce data, user data being recorded or reproduced on or from the segment regions based on the predetermined rules if the access control information is not identified by the apparatus, the update information indicating number of times the access control information is updated, wherein the number of the access control information is limited to a predetermined value; and
a management area for storing status information, the status information indicating at least whether each version of the access control information is valid and being changed to indicate that a previously-recorded version of access control information is invalid and that an updated version of access control information is valid in response to updating of the access control information.

2. The recording medium of claim 1, wherein the predetermined rules specify operation/operations to be applicable to the recording medium when the access control information is not known to the apparatus.

3. The recording medium of claim 1, wherein the predetermined rules are applicable to all of the segment regions within the user data area.

4. The recording medium of claim 1, wherein the access control information further includes segment information for indicating number of the segment regions to which the corresponding access control information applies.

5. The recording medium of claim 4, wherein the number of the segment regions is limited to a predetermined value.

6. The recording medium of claim 1, further comprising:
a backup area for storing a copy of the access control information, wherein the status information further indicates a status of the copy of the access control information.

7. The recording medium of claim 1, wherein the access control information is provided in the control data area within a recording layer to which the corresponding access control information applies, if the recording medium includes a plurality of recording layers.

8. A method of recording/reproducing data on/from a recording medium, comprising:
updating access control information in the recording medium, the access control information controlling an access to a plurality of segment regions within a user data area of the recording medium and specifying the segment regions to which the corresponding access control information applies, the access control information including predetermined rules and update information, the predetermined rules being used to control the access and specifying an operation to be applicable to the record medium when the access control information is not identified by an apparatus attempting to record/reproduce data, the update information indicating number of times the access control information is updated, wherein different versions of the access control information are included in the recording medium, and the number of the access control information is limited to a predetermined value;
changing status information in response to the updating of the access control information, the status information indicating at least whether each version of the access control information is valid or not and being changed to indicate that a previously-recorded version of access control information is invalid and that an updated version of access control information is valid in response to the updating of the access control information, the status information being separated from the access control information;
determining whether the read access control information is identified by the apparatus; and
recording or reproducing user data on or from the segment regions based on the predetermined rules if the access control information is not identified by the apparatus.

9. The method of claim 8, wherein the access control information further includes segment information for indicating number of the segment regions to which the corresponding access control information applies.

10. The method of claim 8, further comprising:
recording a copy of the updated access control information in the recording medium, wherein the status information further indicates a status of the copy of the updated access control information.

11. The method of claim 8, wherein an updated version of the access control information is recorded in a recording layer to which the corresponding access control information applies, if the recording medium includes a plurality of recording layers.

12. An apparatus for recording/reproducing data on/from a recording medium, comprising:
a pickup configured to record/reproduce data on/from the recording medium; and
a controller configured to update access control information in the recording medium, the access control information controlling an access to a plurality of segment regions within a user data area of the recording medium and specifying the segment regions to which the corresponding access control information applies, the access control information including predetermined rules and update information, the predetermined rules being used to control the access and specifying an operation to be applicable to the record medium when the access control information is not identified by the apparatus, the update information indicating number of times the access control information is updated, wherein different versions of the access control information are included in the recording medium, and the number of the access control information is limited to a predetermined value, and the controller configured to change status information in response to the updating of the access control information, the status information indicating at least whether each version of the access control information is valid or not and being changed to indicate that a previously-recorded version of access control information is invalid and that an updated version of access control information is valid in response to the updating of the access control information, the status information being separated from the access control information, the controller configured to determine whether the access control information is identified and control the pickup to record or reproduce user data on or from the segment regions based on the predetermined rules if the access control information is not identified.

13. The apparatus of claim 12, wherein the controller is configured to update the access control information to include the predetermined rules.

14. The apparatus of claim 12, wherein the controller is configured to update the access control information to include segment information for indicating number of the segment regions to which the corresponding access control information applies.

15. The apparatus of claim 12, wherein the controller is further configured to control the pickup to record a copy of the updated access control information in the recording medium and to change the status information further to indicate a status of the copy of the updated access control information.

16. The apparatus of claim 12, wherein the controller is configured to record an updated version of the access control information in a recording layer to which the corresponding access control information applies, if the recording medium includes a plurality of recording layers.

17. A method for recording/reproducing data on/from a recording medium, comprising:
reading status information for indicating a status of access control information from the recording medium, the status information being changed to indicate that a previously-recorded version of access control information is invalid and that an updated version of access control information is valid in response to updating of the access control information, the status information being separated from the access control information; and reading at least one access control information from the recording medium based on the status information, the access control information controlling an access to a plurality of segment regions within a user data area of the recording medium and specifying the segment regions to which the corresponding access control information applies, the access control information including predetermined rules and update information, the predetermined rules being used to control the access and specifying an operation to be applicable to the record medium when the access control information is not identified by an apparatus attempting to record/reproduce data, the update information indicating number of times the access control information is updated, wherein different versions of the access control information are included in the recording medium, and the number of the access control information is limited to a predetermined value;

determining whether the read access control information is identified by the apparatus; and recording or reproducing user data on or from the segment regions based on the predetermined rules if the access control information is not identified by the apparatus.

18. The method of claim 17, wherein the access control information further includes segment information for indicating number of the segment regions to which the corresponding access control information applies.

19. The method of claim 17, wherein the access control information is provided in a recording layer to which the corresponding access control information applies, if the recording medium includes a plurality of recording layers.

20. An apparatus for recording/reproducing data on/from a recording medium, comprising:

a pickup configured to record/reproduce data on/from the recording medium; and a controller configured to control the pickup to read status information for indicating a status of access control information from the recording medium, the status information being changed to indicate that a previously-recorded version of access control information is invalid and that an updated version of access control information is valid in response to updating of the access control information, the status information being separated from the access control information, and the controller configured to control the pickup to read at least one access control information from the recording medium based on the status information, the access control information controlling an access to a plurality of segment regions within a user data area of the recording medium and specifying the segment regions to which the corresponding access control information applies, the access control information including predetermined rules and update information, the predetermined rules being used to control the access and specifying an operation to be applicable to the record medium when the access control information is not identified by the apparatus, the update information indicating number of times the access control information is updated, wherein different versions of the access control information are included in the recording medium, and the number of the access control information is limited to a predetermined value, the controller configured to determine whether the access control information is identified and control the pickup to record or reproduce user data on or from the segment regions based on the predetermined rules if the access control information is not identified.

21. The apparatus of claim 20, wherein the access control information further includes segment information for indicating number of the segment regions to which the corresponding access control information applies.

22. The apparatus of claim 20, wherein the access control information is provided in a recording layer to which the corresponding access control information applies, if the recording medium includes a plurality of recording layers.

* * * * *

UNITED STATES PATENT AND TRADEMARK OFFICE
CERTIFICATE OF CORRECTION

PATENT NO. : 7,975,098 B2  
APPLICATION NO. : 11/802477  
DATED : July 5, 2011  
INVENTOR(S) : Yong Cheol Park Page 1 of 1

It is certified that error appears in the above-identified patent and that said Letters Patent is hereby corrected as shown below:

On the Title page, insert:

Item --(30)    Foreign Application Priority Data

July 2, 2004    (KR)......................10-2004-0051610

July 9, 2004    (KR)......................10-2004-0053617--

Signed and Sealed this
Fourth Day of October, 2011

David J. Kappos
*Director of the United States Patent and Trademark Office*